United States Patent [19]

van den Broek

[11] 4,392,627
[45] Jul. 12, 1983

[54] DISMANTLEABLE BOAT CRADLE

[76] Inventor: Frederik H. van den Broek, 48 Willem Klooslaan, Hillegom, Netherlands

[21] Appl. No.: 200,588

[22] Filed: Oct. 24, 1980

[51] Int. Cl.³ .............................. F16M 11/00
[52] U.S. Cl. ............................. 248/176; 269/296
[58] Field of Search ............. 405/4, 7; 280/414.1; 269/296; 114/65 R; 9/400; 248/346, 176

[56] References Cited

U.S. PATENT DOCUMENTS

| | | | |
|---|---|---|---|
| 598,877 | 2/1898 | Rollert | 248/418 |
| 2,490,858 | 12/1949 | Deddo | 269/296 X |
| 2,816,672 | 12/1957 | Facchini | 280/414.1 X |
| 2,923,542 | 2/1960 | Clark et al. | 269/296 |
| 3,131,902 | 5/1964 | Zak | 280/414.1 X |
| 3,139,277 | 6/1964 | Mears | 405/7 X |
| 3,554,394 | 1/1971 | Hedman | 280/414.1 X |
| 3,586,285 | 6/1971 | Modzelewski | 405/7 X |
| 4,155,667 | 5/1979 | Ebsen | 405/7 |

FOREIGN PATENT DOCUMENTS

| | | | |
|---|---|---|---|
| 1593508 | 6/1970 | France | 280/414.1 |
| 7215834 | 6/1973 | Netherlands . | |

*Primary Examiner*—J. Franklin Foss
*Attorney, Agent, or Firm*—Ostrolenk, Faber, Gerb & Soffen

[57] ABSTRACT

Dismantleable boat cradle comprising a frame which forms a closed rectangle and is constructed from profile sections with non-circular cross-section which are connected with each other at the corner points by couplings, which are built up from three tube sections which are mutually perpendicular to each other and which accomodate two frame sections and an upright, of which at least one is open at both ends, said uprights having an adjustable height and carrying support heads.

15 Claims, 9 Drawing Figures

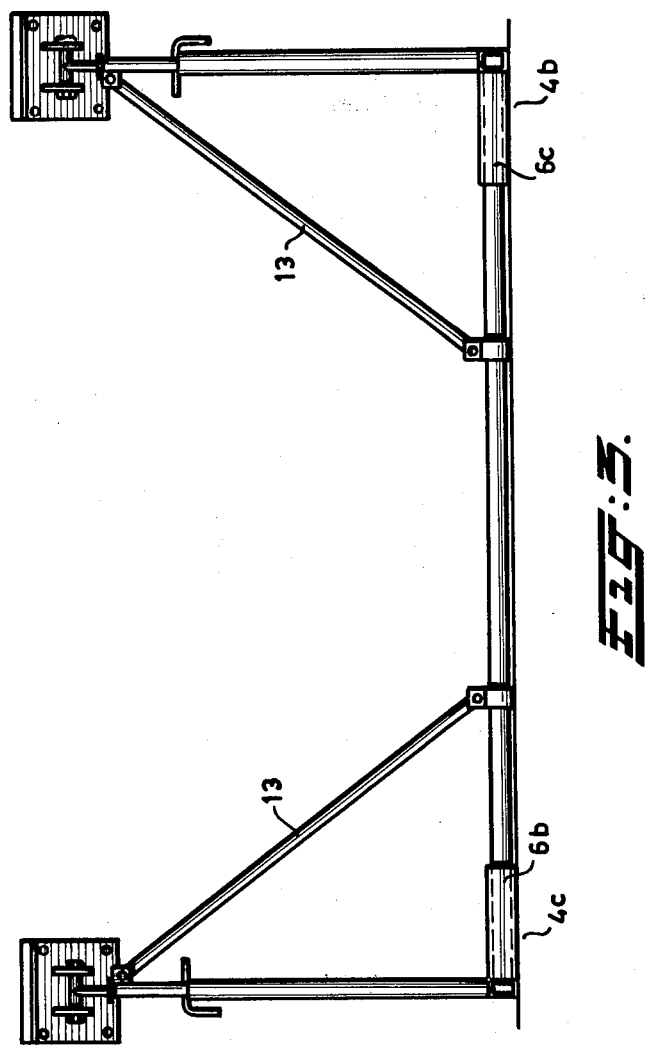

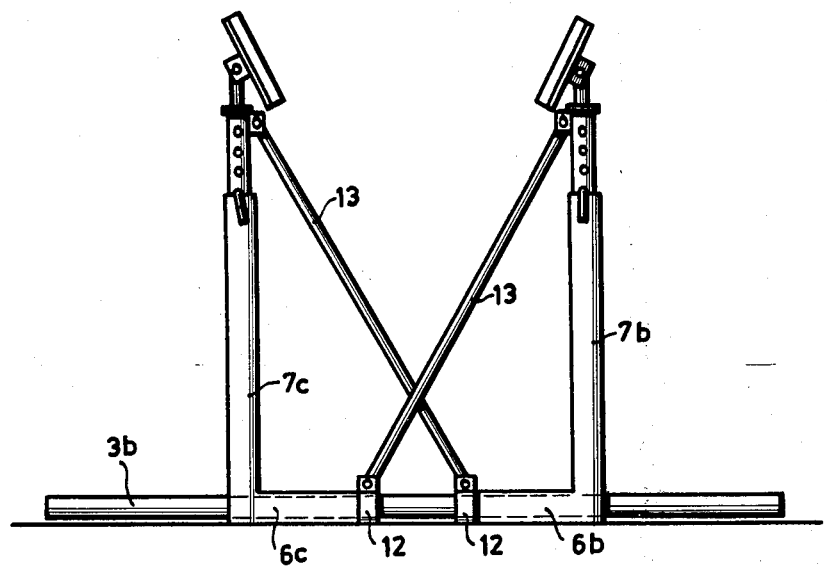
FIG: 4a.
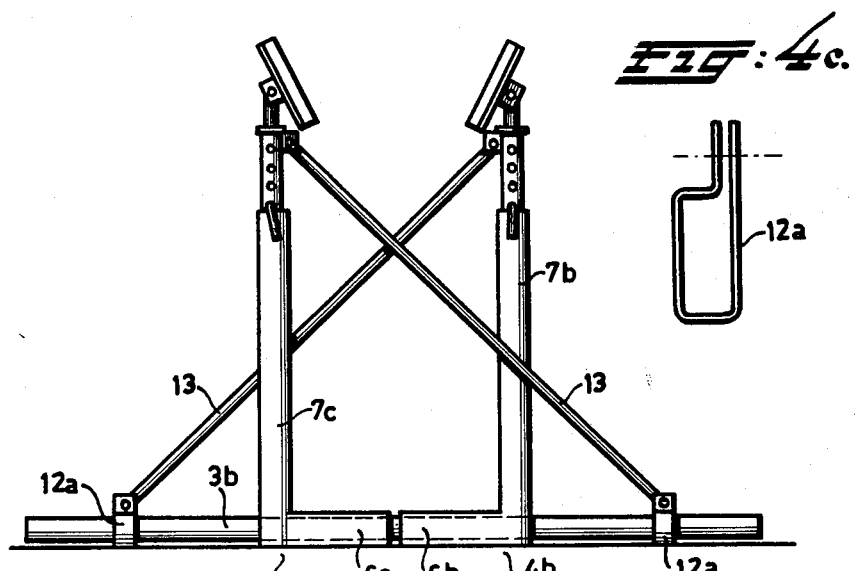
FIG: 4b.
FIG: 4c.

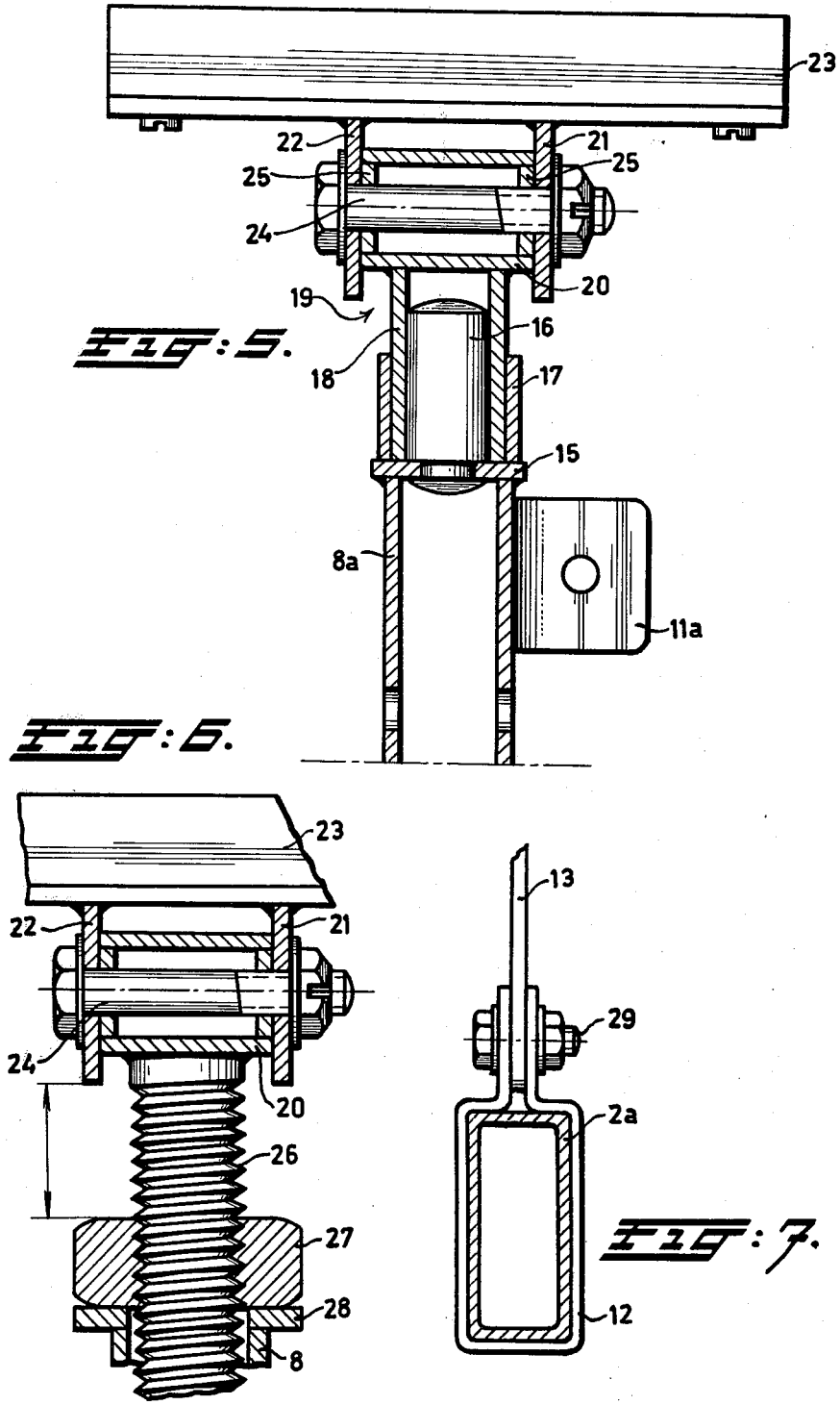

DISMANTLEABLE BOAT CRADLE

BACKGROUND OF THE INVENTION

1. Field of the Invention

The invention relates to a dismantleable boat cradle with a frame having dimensions capable of adjustment in at least one direction, which has uprights adjustable in height and is provided with supporting heads.

2. Description of the Prior Art

A boat cradle as described above is known from Netherlands patent application No. 77.14097 which has been laid out for public inspection. This boat cradle, which is designed particularly for small boats, has a frame which is built up from a single, central, adjustable-length longitudinal member, provided at each end with a A-shaped upright having adjustable-height supporting heads and with a transverse member located in the middle, this similarly terminating at each end in a A-shaped upright.

This known boat cradle has a fairly complicated design and consists of a large number of components connected by clamp joints. The single longitudinal member makes it essential to incorporate special supporting blocks for the keel, so that it is not possible to support the keel over the entire length. The adjustment of the supporting heads for height and distance is a cumbersome and time-consuming operation, particularly since, after each adjustment of the spacing in the longitudinal or transverse direction, the corresponding frame sections have to be clamped firmly before the cradle can be loaded.

SUMMARY OF THE INVENTION

In view of the foregoing factor and conditions of the prior art it is a primary object of the present invention to provide a dismantleable boat cradle which avoids these disadvantages. In accordance with the invention the frame thereof forms a closed rectangle and is constructed from profile sections with non-circular cross-section which at the corner points are connected with each other by couplings built up from three tube sections, of which at least one is open at both ends, which are mutually perpendicular to each other and which accommodate two frame sections and one upright respectively. The profile sections with non-circular cross-section, which fit into the tube portions of the couplings, will under loading twist to some extent around their center line, whereby they are self-locking against longitudinal displacement in these tube sections. Due to the fact that the coupling tube sections are open at each end, the frame profile section which is pushed through this can be shifted over a long distance, so that large dimensional variations are possible and the cradle can be adapted to suit widely differing ship dimensions.

This adaptation to widely differing dimensions is accentuated even further if one of the coupling tube sections is longer than the others, thereby giving the choice of using the coupling with the long tube section on the ground, or having the long tube section vertical. In the first case this provides greater possibilities of adjustment in the horizontal direction, and in the second case considerably adjustment possibilities in the vertical direction.

A cradle construction which can accommodate extremely high forces is obtained if the upright, at the support head end, has at least one coupling lip, to be connected with one end of a supporting bar, the other end of which can be connected with a clamping tube located around a frame profile section.

Attachment of the supporting plate to the upright which can withstand considerable forces is ensured if the upright, at one end, is provided with a supporting lug surrounded by a vertical bush, around which fits the leg of a T-piece built up from tube sections, the other portion of which is located in rotatable fashion around a pin between two flanges which project from the surface of a supporting plate. Although in actual practice, more often than not, it is sufficient to have adjustment facilities comprising a series of holes through which a securing pin is passed, more accurate possibilities of adjustment are obtained if the supporting head is supported by the upright by way of an adjustable bolt and nut support.

In a preferred embodiment the profile sections have a right angled cross-section and consist of tubes.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 3 is a side view of the cradle.

FIGS. 4a and 4b are end views of the cradle, shown with two different widths.

FIG. 4c shows the clamping tube employed.

FIG. 5 is a half view, half cross-section of a supporting plate and the attachment thereof to an upright.

FIG. 6 is a partial view, partial cross-section of a modified supporting head fastening.

FIG. 7 is a half view, half cross-section of a profile tube employed in the cradle in accordance with the invention with a clamping tube attached thereto.

DESCRIPTION OF A PREFERRED EMBODIMENT

Figure 1:
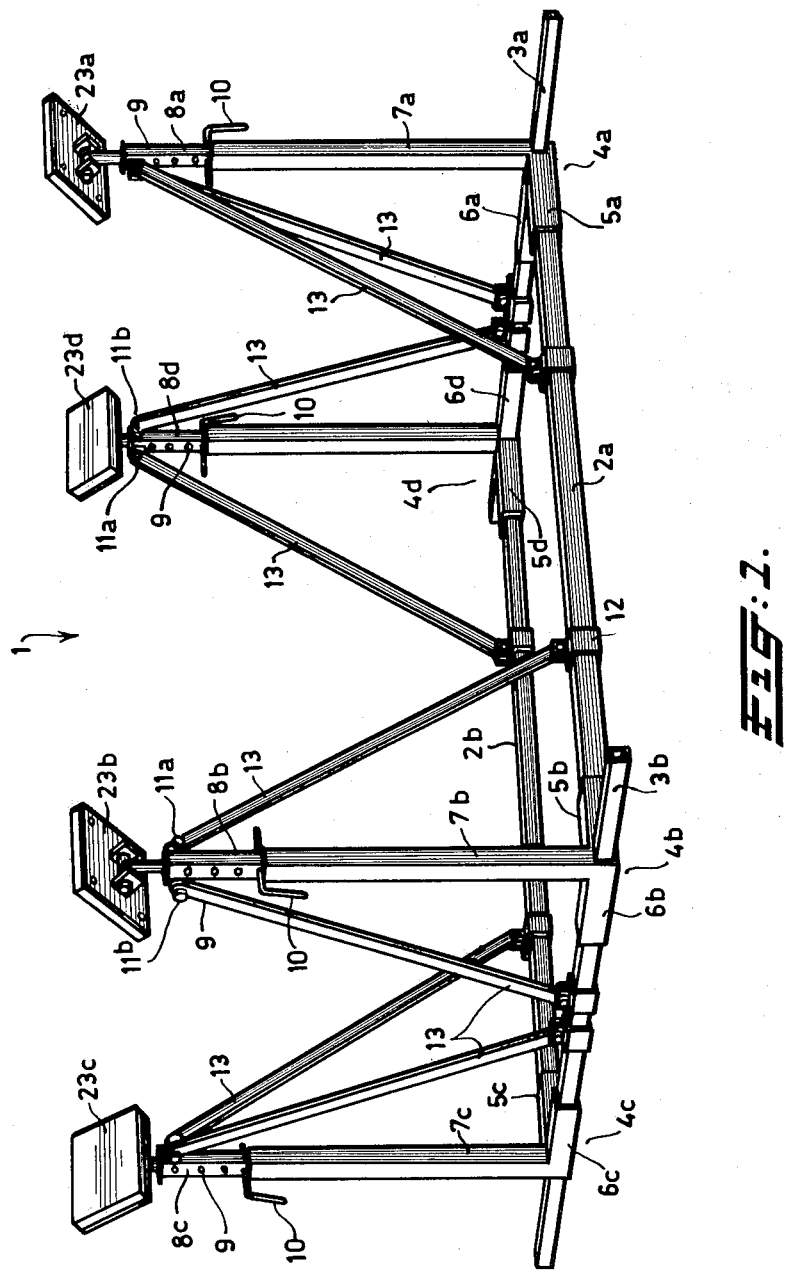
FIG. 1 is a perspective diagram of a completely assembled cradle in accordance with the invention.

Referring now to FIG. 1 the entire supporting cradle designated by the notation No. 1 comprises two longitudinal members 2a, 2b, the transverse members 3a, 3b which are perpendicular thereto, together with the four couplings 4a . . . 4d at the four corner points. Each coupling 4a . . . 4d is built up from three tubes 5, 6 and 7 which are mutually perpendicular (denoted by the additional letter a . . . d for the different coupling), of which, in the embodiment shown, the tubes 5 and 6 rest on the ground whilst tube 7 is vertical. The tubes 6 are open at each end so that they can be pushed for some distance over the horizontal transverse members 3a, 3b. In each vertical coupling tube 7a . . . 7d an upright 8a . . . 8d is attached, which is adjustable in height and fixable by means of the apertures 9 and the locking pins 10. Each upright 8a . . . 8d has at its upper end two coupling lips 11a and 11b respectively, which are perpendicular to each other; stay rods 13 are provided between the coupling lips 11a, 11b and the clamping bushes 12 provided around the frame sections. The angle of slope of these stay rods varies dependent on the height setting of the uprights.

At its upper end, vide FIG. 5, each upright bears a plate 15 having a supporting pin 16 inside a projecting bush 17. Between the pin 16 and the bush 17 is the tube portion 18 of a T-piece, denoted in its entirety by the numeral 19, the other leg 20 of which is located between the flanges 21, 22 fastened to the supporting head 23 via the journal 24 with supporting rings 25.

FIG. 6 is a somewhat modified support. Here the screw thread end 26, on which the adjusting nut 27 is threaded, is welded transverse to the tube 20, this nut resting on the support plate 28 attached to the upper end of the upright 8. By means of this nut accurate height adjustment of the supporting head is possible, although there is very little need for this in actual practice.

As shown by the diagrams the frame is built up from tube sections with non-circular cross sectional area, shown four-sided in the preferred embodiment illustrated. This has the great advantage that when the support heads 23a . . . 23d are loaded by a ship, as a result of the slight outward deflection of the uprights and the couplings, the frame tube sections in the coupling tube sections will rotate around the longitudinal axis and thus become locked. As soon as a boat is placed on the support heads the cradle will no longer be able to change its shape or dimensions and it is then only necessary to tighten up the fastening bolts on the stay rods 13 at the lips 11a, 11b and the clamping bushes 12 respectively, of which FIG. 7 provides a cross-sectional view.

Figure 2:
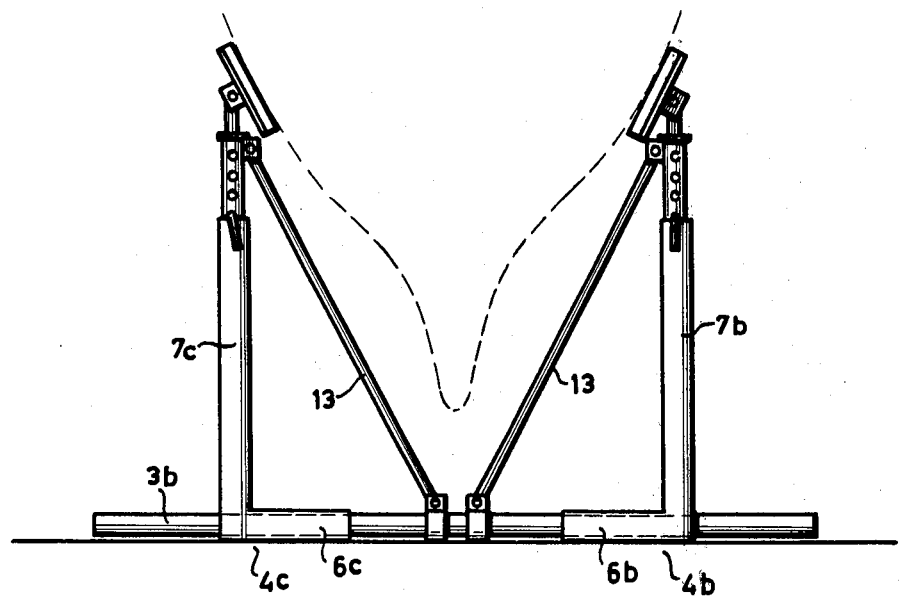
FIG. 2 is an end view of this cradle.

Referring now to FIGS. 2, 4a and 4b the wide range of adjustment in the transverse direction, possible because the transverse coupling tubes 6a . . . 6d are open at both ends, is illustrated. In actual practice there is much greater need for wide possibilities of adjustment in the transverse than in the longitudinal direction, so that with the components present the supporting cradle 1 will be constructed as shown in FIG. 1. However, it is also possible to locate the couplings 4a . . . 4d with the tube sections 6a . . . 6d which pass through in the longitudinal direction or, if a shallow but long cradle has to be provided, to have the long tube sections 7a . . . 7d in the longitudinal direction. FIG. 2 is a wide construction whereby the stay rods 13 do not intersect. FIG. 4a illustrates the situation in which the uprights are located more closely to each other, so that the stay rods must intersect when placed in position, and FIG. 4b shows a situation in which the uprights are so close to each other that the stay rods 13 not only intersect each other but also their ends are located outside the uprights. In such a case it is possible to employ a clamping bush 12a having the shape shown in FIG. 4c.

The measures in accordance with the present invention result in an extremely stable and strong ship cradle which can be employed to deal with practically any situation occurring in practice, which is constructed from a restricted number of standards components, and which can be erected rapidly and easily even by unskilled persons.

What is claimed is:

1. A boat cradle, comprising:
   a frame having the form of a closed rectangle and being constructed from profile sections which define the four sides of the rectangle, the four sides of the rectangle meeting at four corners of the frame;
   at least two of the corners of the frame, a respective coupling being provided; each coupling comprising a first tube section for receiving the profile section located at a first side of the frame, a second tube section for receiving the profile section located at a second side of the frame which side is perpendicular to the first side of the frame, and a third tube section extending upright from the frame;
   at least one of the first and the second tube sections being open at its both opposite ends for enabling the respective profile section received in that tube section to be passed completely through that tube section as the position of that tube section is adjusted along that profile section, and the first tube section being adjustable along the respective profile section received therein;
   an upright supported by the third tube section and having a support head thereon for supporting thereon a keel of a boat.

2. The cradle of claim 1, wherein the first and second tube sections are perpendicular to each other.

3. The cradle of claim 2, wherein the first tube sections of each of the couplings at the corners of the frames are on the profile sectons on opposite, parallel sides of the frame, whereby the spacing between the other pair of parallel sides of the frame may be adjusted.

4. The cradle of claim 1, wherein there is a respective one of the couplings at each of the four corners of the frame.

5. The cradle of claim 4, wherein the first tube sections of each of the couplings at the corners of the frames are on the profile sectons on opposite, parallel sides of the frame, whereby the spacing between the other pair of parallel sides of the frame may be adjusted.

6. The cradle of claim 1, wherein the tube sections are mutually perpendicular.

7. The cradle of claim 1, wherein the profile sections are of non-circular cross-section.

8. The cradle of claim 1, wherein the third tube section is longer than each of the first and second tube sections.

9. The cradle of claim 1, wherein the upright is adjustable in height with respect to the third tube section.

10. The cradle of claim 9, wherein the upright has an end closer to the support head and has a coupling lip at that end of the upright; a clamping bush located on a profile section meeting the coupling to which the respective upright is connected; and a supporting rod extending between the coupling lip and the clamping bush for aiding in support of the third tube section and the upright.

11. A boat cradle, comprising:
    a frame having the form of a closed rectangle and being constructed from profile sections which define the four sides of the rectangle, the four sides of the rectangle meeting at four corners of the frame; the profile sections being of non-circular cross-section;
    at each of the corners, a respective coupling being provided; each coupling comprising a first tube section for receiving the profile section located at a first side of the frame, a second tube section for receiving the profile section located at a second side of the frame which side is perpendicular to the first side of the frame, and a third tube section extending upright from the frame;
    at least one of the tube sections being open at both its opposite ends for enabling the respective profile section received at that tube section to be passed completely through that tube section as the position of that tube section is adjusted along that profile section;
one of the tube sections being longer than each of the other two tube sections; the tube sections being mutually perpendicular;
an upright supported by the third tube section and having a support head therein for supporting thereon a keel of a boat; the upright being adjustable in height with respect to the third tube section.

12. Boat cradle according to claim 11, in which the upright carries at one end a supporting pin which is surrounded by a projecting bush, around which pin fits the leg of a T-piece built up from tube sections, the second portion of which can rotate around a pin which is accomodated between two flanges which project from the surface of a supporting plate.

13. Boat cradle in according to claim 12, in which the support head is supported by an adjustable bolt and nut support for the upright.

14. Boat cradle according to claim 11, in which the profile sections have a right-angled cross-section.

15. Boat cradle according to claim 11, in which the profile sections consist of tubes.

* * * * *